3,560,400
PROCESS FOR CONCENTRATING
SILICA AQUASOLS
Henry Thomas Joseph Chilton, Llangollen, Wales, assignor to Monsanto Chemicals Limited, London, England, a British company
No Drawing. Filed Dec. 13, 1967, Ser. No. 690,061
Claims priority, application Great Britain, Dec. 23, 1966, 57,649/66
Int. Cl. B01d *13/00;* B01j *13/00*
U.S. Cl. 252—313                           6 Claims

ABSTRACT OF THE DISCLOSURE

Process for the production of a concentrated silica aquasol, which process comprises the removal of water from a dilute silica aquasol which is contained in one compartment which is separated from a second compartment by a membrane which is permeable by water molecules but not by the colloidal particles of silica. The water transfers from said aquasol in the first compartment to a liquid contained in the second compartment by means, for example, of pressure applied to the aquasol. An improvement in the throughput is achieved by pretreating the aquasol with ion-exchange resins to reduce the pH to a value of from about 2 to about 4.

---

This invention relates to a process for the production of aqueous colloidal compositions, in particular to a process for the production of concentrated silica aquasols.

Aqueous silica sols have a variety of applications, being used for example in the treatment of textiles and as binding agents in the production of ceramic refractories. The stability of such sols is a function of their concentration, and it has been a matter of commercial significance in relation to the supply and transport of these materials that originally they were available only in relatively dilute forms. In recent years considerable progress has been made towards obtaining stable sols containing higher concentrations of colloidal silica, and sols containing in excess of 50% by weight of silica are now commercially available. Known methods of producing silica sols still involve the production of an initial, relatively dilute sol, and the progress has accordingly been in devising methods of concentrating silica sols during and after which the stability of the sol is retained. The present invention provides a novel method of reducing the water contents of dilute silica sols with a view to improving the economics of supplying such materials, the more concentrated sols so obtained being usable as such for certain applications or dilutable to give stable sols of lower concentration if desired.

The process of the invention is one for the concentration of an aqueous silica sol, in which the sol to be concentrated and water or aqueous solution are placed respectively in two compartments separated by a membrane that is permeable by water molecules but not by the colloidal particles of silica, the arrangement being such that there is a net transport of water out of the sol.

In a preferred manner of operating, the liquid in the second compartment is water and the net flow of water out of the sol is effected by applying pressure to the sol. In an alternative manner of operating, the liquid in the second compartment is a solution, of a salt for example, of such concentration that the net flow of water in the absence of externally applied pressure, is from the sol into the solution by virtue of osmosis.

Membranes that can be used in the process of the invention include membranes of nitrocellulose, cellulose, cellulose acetate and polyion complex resins made by reacting cationic and anionic polyelectrolytes to produce an ionic cross-linked structure. A typical nitrocellulose membrane can be made by pouring a 3% solution of a nitrocellulose having a nitrogen content of 10.8–11% in an ether-alcohol mixture (75:25 parts by volume) on to a horizontal surface to form a layer of uniform thickness, and then allowing the solvents to evaporate under controlled conditions. At a certain residual solvent content, the film sets to a gel, which is then stabilized by flooding with water and washing to remove the remaining solvent. Cellulose acetate membranes can be made by casting from a concentrated solution of cellulose acetate and plasticiser in a volatile solvent such as acetone. Membranes which have proved satisfactory in practice include the commercially available microporous membranes sold under the names Sartorius and Millipore. Cellulose acetate is the preferred membrane material.

Membranes having a range of porosities and thicknesses can be used in the process of the invention. The optimum porosity in any particular instance is related to the average particle size of the silica sol to be concentrated and can be determined by relatively simple experimentation. Membranes having thicknesses of from 0.002 to 0.004 inch have been found suitable when adequately supported, using for example a sintered glass, sintered stainless steel or porous fiberglass plate. The membranes can be characterized by their throughput of water in gallons/square foot using either pure water or standard salt solution under pressure.

Optimum permeability is related to optimum operating pressure. Typically, the operating pressure may be in the range 25 to 1,500 pounds per square inch. Good results have been obtained using membranes having initial water permeabilities of from 40 to 180 U.S. gallons/square foot/day at pressures of from 400 to 900 pounds per square inch. Membranes having higher initial permeabilities, for example, from 200 to 500 U.S. gallons/square foot/day can be operated at lower pressures, for example, from 50 to 100 pounds per square inch. The usual ranges are thus membrane permeabilities of from 40 to 500 U.S. gallons/square foot/day and pressures of from 50 to 900 pounds per square inch.

The process of the invention is most useful for the concentration of silica sols having a silica content in the range 5 to 10% by weight to sols having a silica content of at least 30% by weight, for example from 40 to 50% by weight. Normally the maximum concentration of silica that can be obtained in a stable sol produced by the process is approximately 60% by weight, but within this limitation the method can be used to effect any desired degree of concentration of a sol having any silica content.

The method is applicable to the concentration of sols having a wide range of particle sizes, varying for example from sols in which the average particle diameter determined by light scattering is 250 A. or less, which may be clear or translucent in appearance, to turbid sols in which the average particle diameter may be, for example from 500 to 2,000 A.

The method usually employed for the production of the initial dilute silica sol involves contact of a dilute aqueous solution of sodium silicate with a cation-exchange material in the acid form. The initial product is a colloidal dispersion of silicic acid containing polysilicate units having a plurality of hydroxyl groups. These hydroxyl groups are highly reactive and tend to form linkages between the polysilicate units such that under uncontrolled conditions gelation of the sol readily occurs. To avoid gelation, it is usually necessary to limit the concentration of the sodium silicate solution to about 4% by weight and to limit the proportion of the total sodium extracted and thus the number of free reactive hydroxyl groups formed.

On subjecting a dilute silicic acid sol having a controlled sodium content to an elevated temperature below the boiling point of the sol, particle growth occurs by the condensation of polysilicate units without gelation, and after such a period of "heat stabilization," the sol can be concentrated by evaporation of water at ordinary or reduced pressures to a silica content of up to about 30% by weight. The silica soda ratio for maximum stability of such heat-stabilized sols either before or after concentration, corresponds to a pH of from 9 to 11.

In applying the process of the present invention to the concentration of a dilute heat-stabilized sol, it is found that improved results, in terms of the throughout of the membrane, are obtained if the pH of the sol is reduced by pretreatment with a cation-exchange material in hydrogen form. The stability of the sol passes through a minimum at about pH 6, and preferably the pH is reduced below this range to a pH of from 2 to 4. Some improvement occurs, however, if the pH is reduced to from 7 to 8. Suitable cation-exchange materials are resins containing sulfonic acid groups, for example sulfonated polystyrene cross-linked with divinyl benzene.

Still further improvements in the throughput of the membrane are obtained by pretreating the dilute, heat-stabilized sol with an anion-exchange resin in hydroxyl form. The anion-exchange resin should be a strongly basic resin capable of removing weak anions such as carbonate or silicate. The functional group in such resins is usually quaternary ammonium; suitable anion-exchange resins are described, for example, in U.S. Pat. No. 2,591,573. Preferably the sol before concentration is subjected to treatment with both a cation-exchange and an anion-exchange material, preferably in that order. The effect of the treatment with an anion-exchange material is shown by a slight rise, generally at least 0.01, in the pH of the sol. The duration of contact can be from such time as this minimum pH rise is observed to the time when full equilibrium between the anion-exchange material and the sol is attained.

As well as sols produced by the cation-exchange of sodium silicate solution, the process of the invention can be applied to the concentration of dilute silica sols made by other methods, for example by the breakdown of silica gel as described for example in British patent specification No. 649,897 or to the concentration of a dilute, large particle size silica sol produced according to the process described in our British patent specification No. 43,795/66.

In the process of the invention, high silica concentrations in the vicinity of the membrane can cause caking at the membrane surface and reduce the flow rate through the membrane. This problem can be alleviated by arranging for the sol in contact with the membrane to be kept in motion. An agitator can be provided in the compartment which holds the sol, but in the arrangement generally preferred in practice, the compartment forms part of a circulatory system so that the sol can be fed into the compartment under conditions which give the required degree of turbulence at the membrane surface.

The concentration may be performed in a single concentration cell but it is advantageous in practice to have several cells connected in series in which the sol is progressively concentrated and, if necessary, means by which the partially concentrated sol may be recycled until the required silica concentration is attained.

The stabilities of silica sols depend on a number of factors including their electrolyte content and pH. Certain types of membrane that can be used in the present process are permeable to ions as well as to water molecules, but in the event that this results in a loss of stabilizing electrolyte or a change in pH, appropriate additions of electrolyte, alkali or acid to the concentrated sol can be made as required.

The invention is illustrated by the following examples.

EXAMPLE I

A series of four cells, each having two compartments, were used in this example to progressively concentrate a dilute silica aquasol. The silica sol to be concentrated was passed through a pump operated by a compressed air line having a regulating air pressure gauge. The pressure at which the sol left the pump was measured on the fluid pressure gauge and the effect of the pump strokes on the pressure was smoothed out by an accumulator. The sol under pressure was then passed through the succession of cells in which the concentration took place by means of the water from the sol being removed in increments via the pressure differential between the two compartments of each cell. The second compartment of each cell contained water which was at a pressure lower than the pressure of the sol. The rate of discharge of permeate from the cells was measured by means of flow meters on the permeate discharge lines and the concentrated sol passed out of the apparatus, to be either recycled or collected, along another and separate discharge line.

A silica sol having a silica content of 6.6% by weight, a pH of 10.05, and an average particle size determined by light scattering of 250 A. was prepared by the cation-exchange of 4% sodium silicate solution, followed by heat stabilization and simultaneous partial evaporation of the initial silicic acid sol.

Samples of this sol were concentrated in the apparatus described above, with recirculation of the concentrate, using cellulose acetate membranes of three different water porosities, namely 150, 89.5 and 48.0 U.S. gallons/square foot/day at a pressure of 800 pounds per square inch. After 5 hours, the throughput of permeate of the two faster membranes had dropped to about 50 U.S. gallons/square foot/day and that of the slowest membrane to about 40 U.S. gallons/square foot/day. After 6 hours, the sol concentrated using the fastest membrane had a silica content of 17.3% by weight.

EXAMPLE II

The sol having a silica content of 17.3% by weight obtained according to Example I was treated with cation- and anion-exchange resins (Amberlite 1R–120M and Amberlite 1R–45(OH) respectively) thereby reducing its pH to 2.45. Concentration of the treated sol was then continued using the apparatus described in Example I fitted with a new cellulose acetate membrane having an initial water permeability of 150 U.S. gallons/square foot/day at 800 pounds per square inch pressure in each of the concentration cells.

Permeation rate fell as the amount of silica in the concentrate increased, but a 30% by weighat sol was obtained after 4 hours.

EXAMPLE III

A silica sol prepared from sodium silicate and heat stabilized as described in Example I, having a silica content of 3.3% by weight and a pH of 10.0, was treated with cation- and anion-exchange resins, thereby reducing the pH to 2.4.

This sol was concentrated using cellulose acetate membranes having initial water permeabilities of 150 U.S. gallons/square foot/day in the apparatus described in Example I, with recirculation of concentrate. A concentrate having a silica content of 22% by weight was obtained after 6 hours.

EXAMPLE IV

Concentration of the 17.3% by weight sol obtained in Example I was continued using fresh membranes as described in Example II but without pretreatment of the sol with cation- and anion-exchange resins. In another experiment, a further sample of the 17.3% by weight sol was concentrated similarly but after treatment with only the cation-exchange resin. The permeabilities of the membranes at a 30% by weight silica content of the concentrates are given in the table below, with the figure for the concentration run described in Example II included for comparison.

| Treatment of initial 17.3% by weight sol | pH | Limiting throughput in U.S. gallons/sq. ft./day |
|---|---|---|
| None | 9.9 | 14 |
| Cation exchanged | 2.2 | 28.2 |
| Cation/anion exchanged | 2.45 | 31.5 |

The improvement in throughput achieved by pretreating the sol with ion-exchange resins is apparent.

What is claimed is:

1. A process for the concentration of an aqueous silica sol, which process comprises the removal of water from a dilute silica sol, having a silica content of less than 60% by weight and which has been deionized to a pH of about 2 to about 4, said sol to be concentrated and a second liquid being contained respectively in two compartments separated by a membrane which is permeable by water molecules but not by the colloidal particles of silica, the arrangement being such that there is a net transport of water out of the sol and into said second liquid, whereby a silica sol having an increased silica content is obtained.

2. A process according to claim 1, in which said liquid in the second compartment is water and the net flow of water out of the sol is effected by applying pressure to the sol.

3. A process according to claim 2, in which the membrane is a cellulose acetate membrane.

4. A process according to claim 3, in which the membrane is characterized by having a water permeability of from about 40 to about 500 U.S. gallons/square foot/day at an applied pressure of from about 50 to about 900 pounds per square inch.

5. A process according to claim 4, in which the sol to be concentrated has been obtained by contacting sodium silicate solution with a cation-exchange material in the acid form to give a silicic acid sol, heat-stabilizing the silicic acid sol at a pH of from about 9 to about 11, and contacting the heat-stabilized sol with a cation-exchange resin in the acid form to reduce the pH to within the range of from about 2 to about 4.

6. A process according to claim 4, in which the sol to be concentrated has been obtained by contacting a heat stabilized, cation-exchange resin-treated sol with an anion-exchange resin having the functional groups in hydroxyl form.

References Cited

UNITED STATES PATENTS

| 2,577,485 | 12/1951 | Rule | 252—313 |
| 2,750,345 | 6/1956 | Alexander | 252—313 |
| 3,228,877 | 1/1966 | Mahon | 210—22 |

RICHARD D. LOVERING, Primary Examiner

U.S. Cl. X.R.

210—22